United States Patent
Yuasa et al.

(10) Patent No.: US 9,998,007 B2
(45) Date of Patent: Jun. 12, 2018

(54) BOOST CONVERTER WITH FLYING CAPACITOR AND REFRIGERATION CIRCUIT

(71) Applicant: Mitsubishi Electric Corporation, Tokyo (JP)

(72) Inventors: Kenta Yuasa, Tokyo (JP); Shinsaku Kusube, Tokyo (JP); Akihiro Tsumura, Tokyo (JP); Akihiko Iwata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 15/320,503

(22) PCT Filed: Sep. 5, 2014

(86) PCT No.: PCT/JP2014/073544
§ 371 (c)(1),
(2) Date: Dec. 20, 2016

(87) PCT Pub. No.: WO2016/035209
PCT Pub. Date: Mar. 10, 2016

(65) Prior Publication Data
US 2017/0201186 A1  Jul. 13, 2017

(51) Int. Cl.
*H02M 3/158* (2006.01)
*H02M 1/08* (2006.01)

(52) U.S. Cl.
CPC ............. *H02M 3/158* (2013.01); *H02M 1/08* (2013.01)

(58) Field of Classification Search
CPC ...... H02M 3/158–3/1588; H02M 5/40–5/4585
See application file for complete search history.

(56) References Cited

U.S. PATENT DOCUMENTS

2006/0130512 A1* 6/2006 Seo ............. F04B 25/005
62/389
2012/0126741 A1* 5/2012 El-Refaie ........... H02P 27/08
318/812

(Continued)

FOREIGN PATENT DOCUMENTS

JP  06-339279 A  12/1994
JP  H07-337019 A  12/1995

(Continued)

OTHER PUBLICATIONS

International Search Report of the International Searching Authority dated Nov. 25, 2014 for the corresponding international application No. PCT/JP2014/073544 (and English translation).

*Primary Examiner* — Gary L Laxton
*Assistant Examiner* — Peter Novak
(74) *Attorney, Agent, or Firm* — Posz Law Group, PLC (57) ABSTRACT

A power conversion device is provided that includes a rectifier, a booster circuit configured to boost an output voltage of the rectifier, a smoothing capacitor configured to smooth an output voltage of the booster circuit, and an inverter circuit configured to convert a DC voltage of the smoothing capacitor to an AC voltage and drive a motor forming a part of a device supplied with the voltage after the conversion. In addition, a reactor, a first backflow prevention element, a second backflow prevention element, a first switching element, a second switching element, an intermediate capacitor, and a controller configured to control the first switching element and the second switching element, are included.

13 Claims, 6 Drawing Sheets

(56) References Cited

U.S. PATENT DOCUMENTS

2013/0002215 A1\* 1/2013 Ikeda ................ H02M 3/158
                                                    323/271
2015/0326124 A1\* 11/2015 Ono .................. H02M 3/158
                                                    323/271

FOREIGN PATENT DOCUMENTS

| JP | 2001-286149 A | 10/2001 |
| JP | 3308993 B | 7/2002 |
| JP | 2010-220364 A | 9/2010 |
| JP | 2013-192383 A | 9/2013 |

\* cited by examiner

BOOST CONVERTER WITH FLYING CAPACITOR AND REFRIGERATION CIRCUIT

CROSS REFERENCE TO RELATED APPLICATION

This application is a U.S. national stage application of PCT/JP2014/073544 filed on Sep. 5, 2014, the contents of which are incorporated herein by reference.

TECHNICAL FIELD

The present invention relates to a power conversion device and a refrigeration cycle apparatus, such as a refrigeration air-conditioning apparatus, using the power conversion device.

BACKGROUND ART

In a large-capacity inverter device that drives a motor for a compressor and a fan, etc. of a refrigeration air-conditioning apparatus, a method is used in which a DC busbar voltage for inverter driving is generated by a three-phase full-wave rectifier circuit. In the refrigeration air-conditioning apparatus, in order to increase energy consumption efficiency (COP) during rated cooling and heating operations and full-year energy consumption efficiency (APF) through one year, the motor for the compressor tends to be designed such that an induced voltage (counter-electromotive force) is substantially equal to a power supply voltage at approximately a rotation speed used in rated operation of the refrigeration air-conditioning apparatus. In such a case, when the motor is caused to be operated in a high-speed range exceeding this rotation speed (e.g., during high-load operation), since the inverter device cannot output a voltage equal to or higher than the power supply voltage, the current of the compressor increases due to output voltage saturation, and the efficiency of a converter decreases due to a decrease in motor efficiency and an increase in loss of the inverter device. In addition, the operation range may become narrow depending on the demagnetization resistance of a magnet used in the motor for the compressor and the allowable current and allowable temperature limit of a semiconductor used in the inverter device.

As a countermeasure against these problems, for achieving high-efficiency driving of the motor and expanding the operation range, and for expanding the output voltage range of the inverter device, a power conversion device having a booster circuit has been proposed (see, e.g., Patent Literature 1). Patent Literature 1 proposes an "electric motor driving apparatus characterized in that the DC voltage control means is configured to add a voltage for the amount of change in speed to a predetermined DC voltage command value to be supplied to the voltage conversion circuit, and output the resultant value". In the electric motor driving apparatus in Patent Literature 1, the predetermined DC voltage command value to be supplied to the voltage conversion circuit is set so as to increase in proportion to a motor rotation speed. Therefore, the electric motor driving apparatus in Patent Literature 1 performs control of optimizing a boost amount of the booster circuit and is able to minimize loss occurring in the booster circuit at each rotation speed, by maintaining the boost amount at a necessary minimum.

In addition, Patent Literature 2 proposes a "control method for a self-excited rectifying device, characterized in that in response to the magnitude of an output value of the DC power measuring means, the carrier frequency of the carrier frequency varying means is increased when the output value is low, and is decreased when the output value is high". In the control method in Patent Literature 2, by varying the carrier frequency, the elimination ratio of noise current by an LCR filter is changed. With such a configuration, it is possible to improve the total power factor.

CITATION LIST

Patent Literature

Patent Literature 1: Japanese Patent No. 3308993 (claim 1, etc.)
Patent Literature 2: Japanese Unexamined Patent Application Publication No. 7-337019 (claim 1, etc.)

SUMMARY OF INVENTION

Technical Problem

However, in the booster circuit disclosed in Patent Literature 1, it is generally necessary to set a switching frequency to a high frequency, so that there is a problem that the switching loss increases. The switching loss improves by decreasing the switching frequency. However, when the switching frequency is decreased, a ripple current flowing out to the power supply side increases. In addition, to inhibit the ripple current, the size of a reactor increases.

Moreover, in the control method in Patent Literature 2, in order to linearly change the carrier frequency, there is a problem that the ripple current flowing out to the power supply side increases under the condition that the carrier frequency is low. It is not preferable that a high-frequency ripple current flows out. Thus, in Patent Literature 2, the LCR filter is provided. However, as the carrier frequency is made lower, the LCR filter becomes larger in size, resulting in an increase in cost. In addition, to linearly change the carrier frequency, the frequency range of noise current occurring due to switching operation becomes wide, and a frequency range in which attenuation by a noise filter is necessary becomes wide, so that not only the difficulty in designing the noise filter increases but also the cost may increase.

The present invention has been made to solve the above-described problems, and a first object of the present invention is to provide a power conversion device that has improved switching loss and achieves cost reduction. Furthermore, a second object of the present invention is to provide a refrigeration cycle apparatus using such a power conversion device.

Solution to Problem

A power conversion device according to the present invention includes: a rectifier configured to rectify an AC voltage supplied from an AC power supply; a booster circuit configured to boost an output voltage of the rectifier; a smoothing capacitor configured to smooth an output voltage from the booster circuit; an inverter connected in parallel with the smoothing capacitor and configured to convert a DC voltage to an AC voltage and drive a motor forming a part of a device supplied with the AC voltage after the conversion; and a controller configured to control a first switching element and a second switching element. The booster circuit includes: a first backflow prevention element, a second backflow prevention element, a first switching element, and a second switching element connected in series; a reactor connected at one end thereof to the rectifier side and connected at another end thereof to a connection point between the second backflow prevention element and the first switching element; and an intermediate capacitor connected in parallel with a series circuit of the second backflow prevention element and the first switching element. The intermediate capacitor is charged via the second backflow prevention element as a result of an ON operation of the second switching element, and the intermediate capacitor is discharged via the second backflow prevention element as a result of an ON operation of the first switching element, and a carrier frequency at which the first switching element and the second switching element are turned ON/OFF is changed in accordance with information based on an operation state of the device supplied with the AC voltage after the conversion.

Advantageous Effects of Invention

According to the present invention, by adopting the booster circuit composed of the above configuration, it is made possible to decrease the carrier frequency without increasing a ripple current flowing through the reactor, and it is made possible to decrease loss caused by switching. Thus, switching loss is improved. In addition, since the ripple current is not increased, the reactor and the smoothing capacitor are avoided from being increased in size, so that cost reduction is achieved. In particular, in the case where double boosting with which the ripple current does not increase even if the carrier frequency is decreased is selected, it is possible to minimize the reactor and the smoothing capacitor.

DESCRIPTION OF EMBODIMENTS

Embodiment 1

(Configuration of Power Conversion Device)

Figure 1:
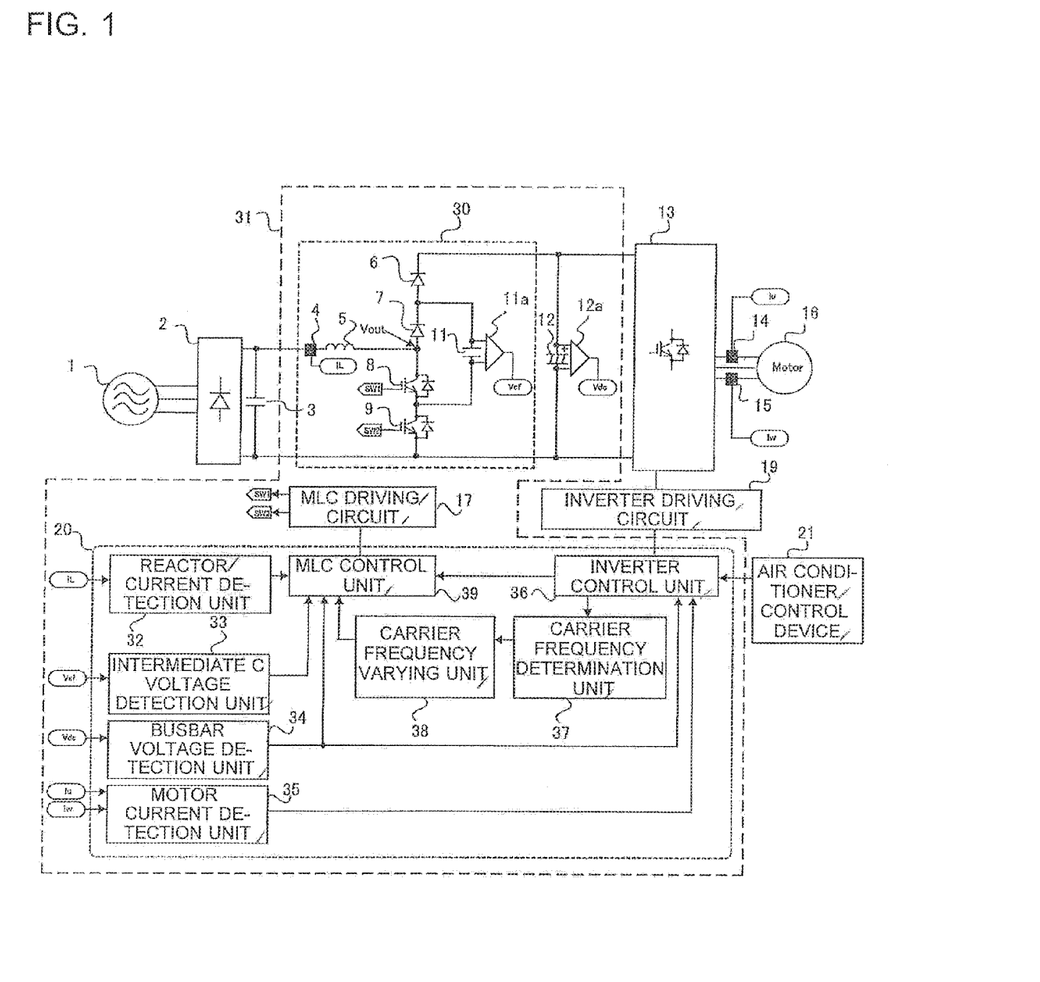
FIG. 1 is a circuit diagram of a power conversion device according to Embodiment 1 of the present invention.

Hereinafter, a power conversion device according to Embodiment 1 of the present invention will be described with reference to the drawings. FIG. 1 is a circuit diagram of the power conversion device power according to Embodiment 1 of the present invention. The configuration of the power conversion device will be described with reference to FIG. 1. The power conversion device in FIG. 1 includes a rectifier 2 as a rectifier circuit, a ripple filter 3, a reactor current sensor 4, a reactor 5, a first backflow prevention diode 6, a second backflow prevention diode 7, a first switching element 8, a second switching element 9, an intermediate capacitor 11, a voltage sensor 11a, a smoothing capacitor 12, a voltage sensor 12a, an inverter circuit 13, motor current sensors 14 and 15, an MLC driving circuit 17, an inverter driving circuit 19, a controller 20, and an air conditioner control device 21. The rectifier 2 converts an AC voltage (e.g., AC 200 V or AC 400 V) of an AC power supply 1 to a DC voltage, and is composed of, for example, a three-phase full-wave rectifier in which six diodes are bridge-connected.

The reactor 5, the intermediate capacitor 11, the first backflow prevention diode 6, the second backflow prevention diode 7, the first switching element 8, and the second switching element 9 in FIG. 1 form a booster circuit 30. The booster circuit 30 forms a multilevel chopper circuit (abbreviated as MLC) that boosts output from the rectifier 2 to an arbitrary voltage. In the booster circuit 30, by using electrostatic energy of the intermediate capacitor 11 as well as the reactor 5, it is possible to make a boost amount larger than in the booster circuit disclosed in Patent Literature 1. In the booster circuit 30, the first backflow prevention diode 6, the second backflow prevention diode 7, the first switching element 8, and the second switching element 9 are connected in series, and the entirety thereof is connected in parallel with the smoothing capacitor 12. The reactor 5 is connected at one end thereof to the rectifier 2 and is connected at another end thereof to a connection point between the second backflow prevention diode 7 and the first switching element 8. The intermediate capacitor 11 is connected in parallel with a series circuit of the second backflow prevention diode 7 and the first switching element 8. A current flowing through the reactor 5 is detected by the reactor current sensor 4.

The first backflow prevention diode 6, the second backflow prevention diode 7, the first switching element 8, and the second switching element 9 can be configured by using a wide band gap semiconductor having a large band gap as compared to a silicon (Si) element, such as a silicon carbide (SiC) element, gallium nitride (GaN), and a diamond element. In addition, as the first switching element 8 and the second switching element 9, a semiconductor element other than a wide band gap semiconductor, such as a MOSFET and an IGBT, may be used, and an element such as a fast recovery diode may be used as each backflow prevention diode. The first backflow prevention diode 6 corresponds to a first backflow prevention element of the present invention, and the second backflow prevention diode 7 corresponds to a second backflow prevention element of the present invention.

The smoothing capacitor 12 smooths output from the booster circuit 30 and performs charging. The inverter circuit 13 is connected in parallel with the smoothing capacitor 12 and converts DC power that is smoothed and charged by the smoothing capacitor 12, to AC power (a PWM voltage). The inverter circuit 13 is composed of a plurality of switching elements such as IGBTs. As the switching elements of the inverter circuit 13, a wide band gap semiconductor such as a silicon carbide (SiC) element may be used similarly to the above-described switching elements.

The air conditioner control device 21 serves to control a refrigeration air-conditioning apparatus (refrigeration cycle apparatus) such that the indoor temperature becomes a target temperature. The air conditioner control device 21 determines, for example, a rotation speed of a compressor 51 (motor 16) that forms a part of a device supplied with the AC voltage after the conversion. The refrigeration air-conditioning apparatus will be described in Embodiment 3 described later. The air conditioner control device 21 receives and outputs a capacity command of the air-conditioning apparatus (e.g., a rotation speed of the motor 16) to an inverter control unit 36. The inverter control unit 36 uses the capacity command of the air-conditioning apparatus, outputs of the motor current sensors 14 and 15, and the voltage of the smoothing capacitor 12 to control the motor 16 via the inverter driving circuit 19 such that the rotation speed of the motor 16 is a target rotation speed. The motor current sensor 14 detects a U-phase current of the motor 16, and the motor current sensor 15 detects a W-phase current of the motor 16. In addition, the voltage of the intermediate capacitor 11 is detected by the voltage sensor 11*a*, and the voltage of the smoothing capacitor 12 is detected by the voltage sensor 12*a*. Each of the voltage sensors 11*a* and 12*a* is composed of, for example, an operational amplifier or the like.

The controller 20 includes a reactor current detection unit 32, an intermediate C voltage detection unit 33, a busbar voltage detection unit 34, a motor current detection unit 35, the inverter control unit 36, a carrier frequency determination unit 37, a carrier frequency varying unit 38, and an MLC control unit 39. Here, the reactor current detection unit 32, the intermediate C voltage detection unit 33, the busbar voltage detection unit 34, and the motor current detection unit 35 function as interfaces when outputting detection signals from the reactor current sensor 4, the voltage sensor 11*a*, the voltage sensor 12*a*, the motor current sensor 14, and the motor current sensor 15 to the MLC control unit 39 and the inverter control unit 36.

The carrier frequency determination unit 37 determines a carrier frequency on the basis of information obtained from the inverter control unit 36 (e.g., a motor rotation speed, a degree of modulation, a voltage required for driving the motor 16, etc.). Then, the carrier frequency varying unit 38 sets information on the carrier frequency determined by the carrier frequency determination unit 37, for example, by writing the information into a storage unit included in the MLC control unit 39. The MLC control unit 39 uses the reactor current detected by the reactor current sensor 4, the voltage of the intermediate capacitor 11 detected by the voltage sensor 11*a*, the voltage of the smoothing capacitor 12 detected by the voltage sensor 12*a*, and the carrier frequency set by the carrier frequency varying unit 38 to boost the output voltage of the booster circuit 30 to a target voltage.

The entire controller 20 or all or at least part of the inverter control unit 36, the carrier frequency determination unit 37, the carrier frequency varying unit 38, and the MLC control unit 39, which form the controller 20, are composed of, for example, a microcomputer. In addition, the booster circuit 30, the MLC driving circuit 17, and the controller 20 form a booster circuit unit (boosting device) 31.

(Operation of Booster Circuit 30)

Figure 2:
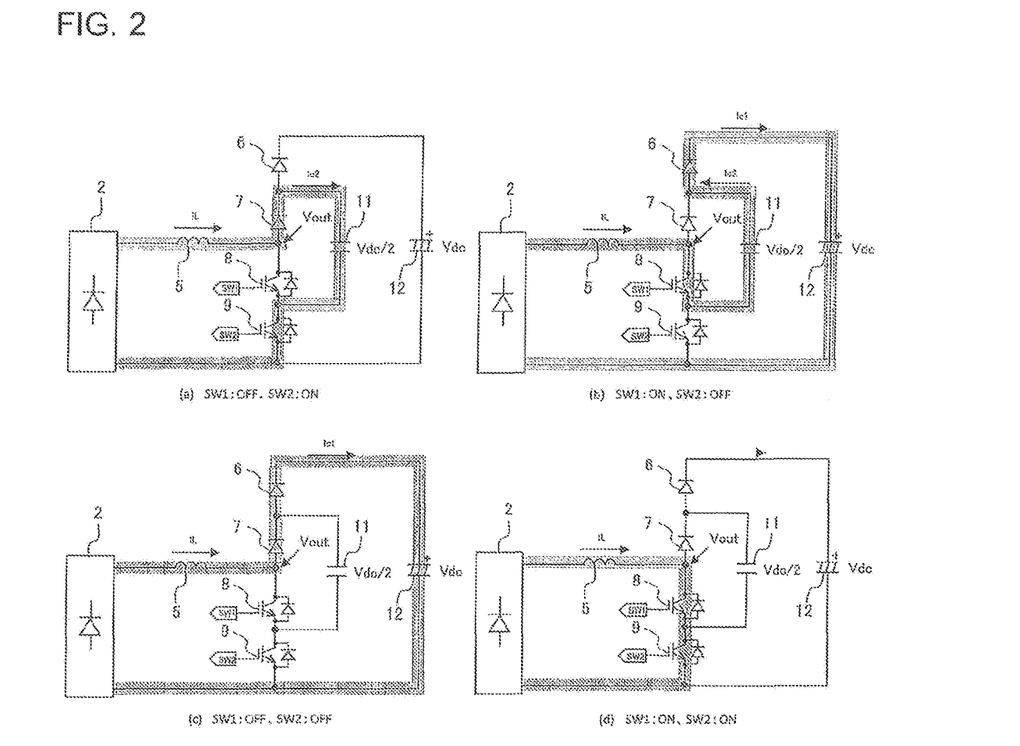
FIG. 2 is a diagram showing a current path per switching pattern of the power conversion device in FIG. 1.

Next, operation of the booster circuit 30 (multilevel converter) will be specifically described with reference to FIG. 2. FIG. 2 is a diagram showing a current path per switching pattern of the power conversion device in FIG. 1. In the operation description, a case (A) of conversion to a DC voltage that is lower than double a power supply voltage, a case (B) of conversion to a DC voltage that is higher than double the power supply voltage, and a case (C) of conversion to a DC voltage that is equal to double the power supply voltage will be described in this order.

First, the case (A) of conversion to a DC voltage that is lower than double the power supply voltage will be described.

(a) A case where a current flows in a path in FIG. 2(*a*) will be described. A current flows in the order of the output voltage of the rectifier 2-the reactor 5-the second backflow prevention diode 7-the intermediate capacitor 11-the second switching element 9-the rectifier 2. The energy of the power supply voltage rectified by the rectifier 2 shifts to the reactor 5 and the intermediate capacitor 11.

(b) Next, in a state of FIG. 2(*c*) where both the first switching element 8 and the second switching element 9 are OFF, the energy stored in the reactor 5 flows as a current in the order of the reactor 5-the second backflow prevention diode 7-the first backflow prevention diode 6-the smoothing capacitor 12-the rectifier 2-the reactor 5, and shifts to the smoothing capacitor 12.

(c) Next, in a state of FIG. 2(*b*), the energy stored in the intermediate capacitor 11 shifts to the intermediate capacitor 11-the first backflow prevention diode 6-the smoothing capacitor 12-the rectifier 2-the reactor 5-the first switching element 8-the intermediate capacitor 11, and is also stored in the reactor 5.

(d) Next, in the state of FIG. 2(*c*) where both the first switching element 8 and the second switching element 9 are OFF, the energy stored in the reactor 5 flows as a current in the order of the reactor 5-the second backflow prevention diode 7-the first backflow prevention diode 6-the smoothing capacitor 12-the rectifier 2-the reactor 5, and shifts to the smoothing capacitor 12. By repeating this series of operations, it is made possible to boost an input voltage to a boost voltage that is within a range of lower than double the input voltage. Switching command values (on-duty command values) for the first switching element 8 and the second switching element 9 in FIG. 2 are calculated by the MLC control unit 39.

Figure 10:
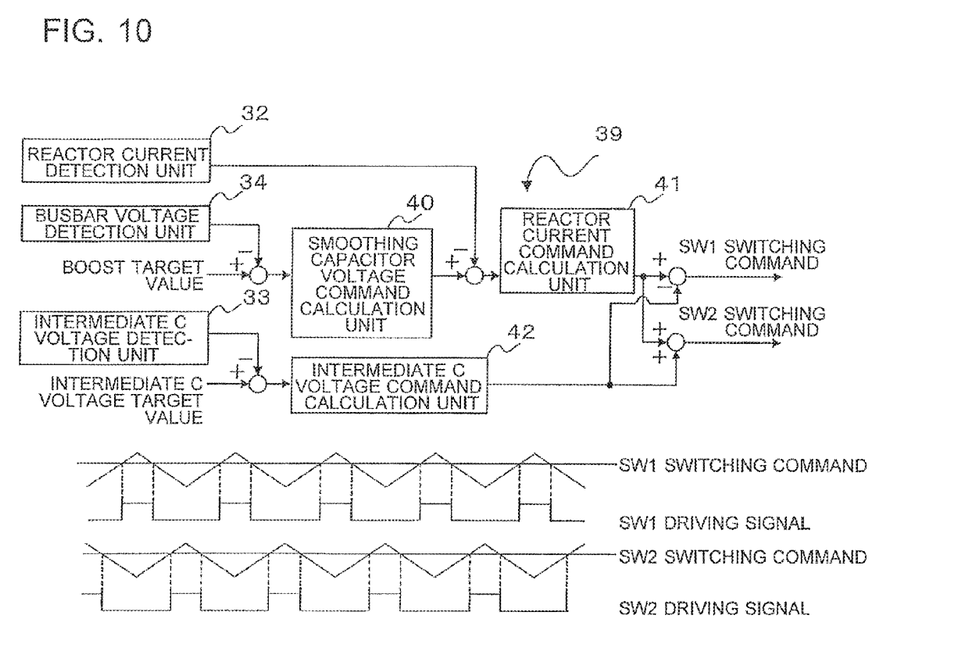
FIG. 10 is a functional block diagram of an MLC control unit in FIG. 1 and a timing chart of driving signals.

FIG. 10 shows a functional block diagram of the MLC control unit 39 and a timing chart of driving signals. The MLC control unit 39 includes a smoothing capacitor voltage command calculation unit 40, a reactor current command calculation unit 41, and an intermediate C voltage command calculation unit 42. Each of the smoothing capacitor voltage command calculation unit 40, the reactor current command calculation unit 41, and the intermediate C voltage command calculation unit 42 performs a calculation process of at least one of proportional control and integral control. First, the smoothing capacitor voltage command calculation unit 40 calculates a smoothing capacitor voltage command value on the basis of the difference between a boost target value that is a target for the smoothing capacitor 12 and a busbar voltage detection value detected by the busbar voltage detection unit 34 (voltage sensor 12*a*). Next, the reactor current command calculation unit 41 calculates a reactor current command value on the basis of the difference between a reactor current detection value detected by the reactor current detection unit 32 (reactor 5) and the smoothing capacitor voltage command value. The intermediate C voltage command calculation unit 42 calculates an intermediate C capacitor voltage command value on the basis of the difference between an intermediate C voltage target value that is a target for the intermediate capacitor 11 and an intermediate C voltage detection value detected by the intermediate C voltage detection unit 33 (voltage sensor 11*a*). Finally, the switching command value for the first switching element 8 is calculated by subtracting the intermediate C capacitor voltage command value from the reactor current command value, and the switching command value for the second switching element 9 is calculated as a switching command value obtained as a result of adding the reactor current command value and the intermediate C capacitor voltage command value. Then, as shown in the timing chart in FIG. 10, driving signals for the first switching element 8 and the second switching element 9 are generated by comparing the switching command value for the first switching element 8 and the switching command value for the second switching element 9 to the level of a carrier signal. By driving each switching element as described above, it is possible to control the smoothing capacitor voltage, the intermediate C voltage, and the reactor current to arbitrary values. The MLC control unit 39 acquires the boost target value and the intermediate C voltage target value from the inverter control unit 36. Since the MLC control unit 39 in FIG. 10 is able to acquire arbitrary smoothing capacitor voltage and intermediate C voltage as described above, the same similarly applies also to the later-described case (B) of conversion to a DC voltage that is higher than double the power supply voltage and the later-described case (C) of conversion to a DC voltage that is equal to double the power supply voltage.

The case (B) of conversion to a DC voltage that is higher than double the power supply voltage will be described. First, in a state of FIG. 2(d), a current flows in the order of the rectifier 2-the reactor 5-the first switching element 8-the second switching element 9-the rectifier 2, and energy is stored in the reactor 5. Thereafter, a current flows in a path of FIG. 2(a)-FIG. 2(d)-FIG. 2(b). By repeating this series of operations, it is made possible to boost an input voltage to a boost voltage that is within a range of higher than double the input voltage. Switching command values (on-duty command values) for the first switching element 8 and the second switching element 9 at this time are also calculated by the MLC control unit 39 shown in FIG. 10 described above.

The case (C) of conversion to a DC voltage that is equal to double the power supply voltage will be described. As a path for current flowing in the case of double boosting, the current path in FIG. 2(a) and the current path in FIG. 2(b) are alternately repeated. Switching command values (on-duty command values) for the first switching element 8 and the second switching element 9 at this time are also calculated by the MLC control unit 39 shown in FIG. 10 described above.

Next, a relationship between the carrier frequency and a ripple $\Delta I$ of the reactor current in Embodiment 1 (the case (C)) will be described with comparison to a conventional art example.

Figure 3:
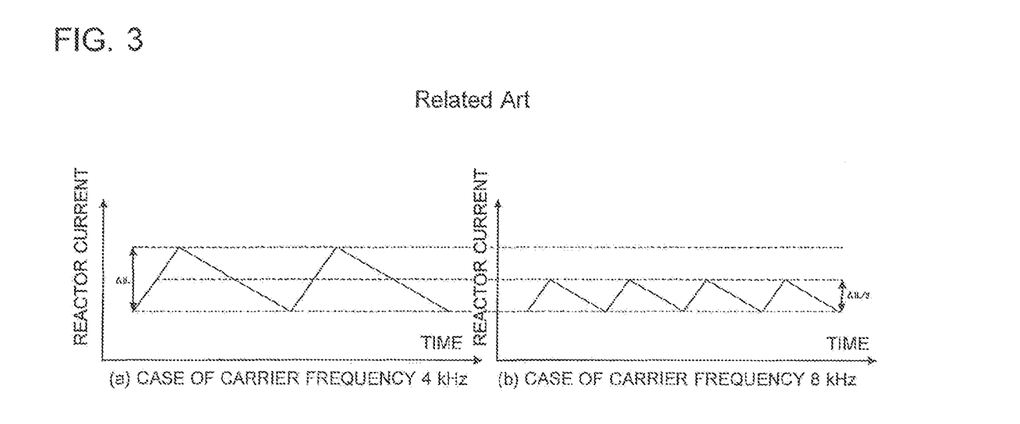
FIG. 3 is a diagram showing a relationship between a carrier frequency and a ripple current ΔI of a booster circuit in Patent Literature 1.

FIG. 3 is a diagram showing a relationship between a carrier frequency and a ripple $\Delta I$ of a reactor current in the booster circuit as shown in Patent Literature 1. In the case of a general booster circuit, the ripple $\Delta I$ is known to be doubled when the carrier frequency is set to be ½ thereof. Therefore, when the carrier frequency is decreased for reducing switching loss, the ripple current increases. As means for reducing the ripple current, it is necessary to increase the inductance value of the reactor 5 or reinforce the ripple filter 3. Any of the cases causes an increase in cost and an increase in size.

Figure 4:
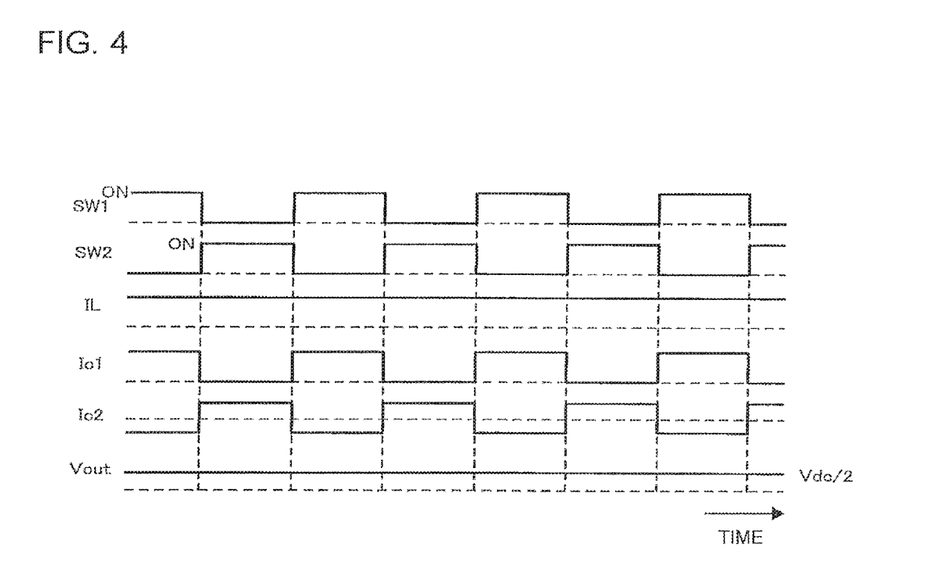
FIG. 4 is a diagram showing a switching pattern during double boosting of the power conversion device in FIG. 1.

FIG. 4 is a diagram showing a switching pattern in the case of conversion to a DC voltage that is equal to double the power supply voltage. As a path for current flowing in the case of double boosting, the current paths in FIGS. 2(a) and 2(b) are alternately repeated as described above. At this time, the switching pattern is as shown in FIG. 4. In FIG. 4, the state of the first switching element 8, the state of the second switching element 9, a reactor current IL (see FIG. 2), a current (IC2) flowing through the intermediate capacitor 11, a current (IC1) flowing through the smoothing capacitor 12, and a voltage (Vout) at the connection point between the first switching element 8 and the reactor 5 are shown in this order. As a feature during double boosting, the voltage Vout at the point at which the reactor 5 and the first switching element 8 are connected is constant regardless of a switching pattern. Therefore, a voltage applied to both ends of the reactor 5 does not change by switching, so that a ripple current flowing through the reactor 5 becomes zero. In Embodiment 1, a merit that a ripple current becomes zero during double boosting is utilized. That is, even when the carrier frequency is decreased, a ripple current becomes zero during double boosting.

The reason why the voltage Vout at the point at which the reactor 5 and the first switching element 8 are connected becomes constant in FIG. 4 is as follows.

A description will be given with an example where the voltage of the intermediate capacitor 11 is controlled to a voltage that is ½ of a voltage Vdc of the smoothing capacitor 12. The voltage Vout in FIG. 2 is as follows in each of the states of FIGS. 2(a) to 2(d). When the voltage of the intermediate capacitor 11 is controlled to Vdc/2, the voltage Vout is Vdc/2 at the time of FIG. 2(a), is Vdc/2 at the time of FIG. 2(b), is Vdc at the time of FIG. 2(c), and is 0 V at the time of FIG. 2(d). As described above, in the case of double boosting, FIG. 2(a) and FIG. 2(b) are alternately repeated, so that Vout is always Vdc/2 and constant.

Figure 5:
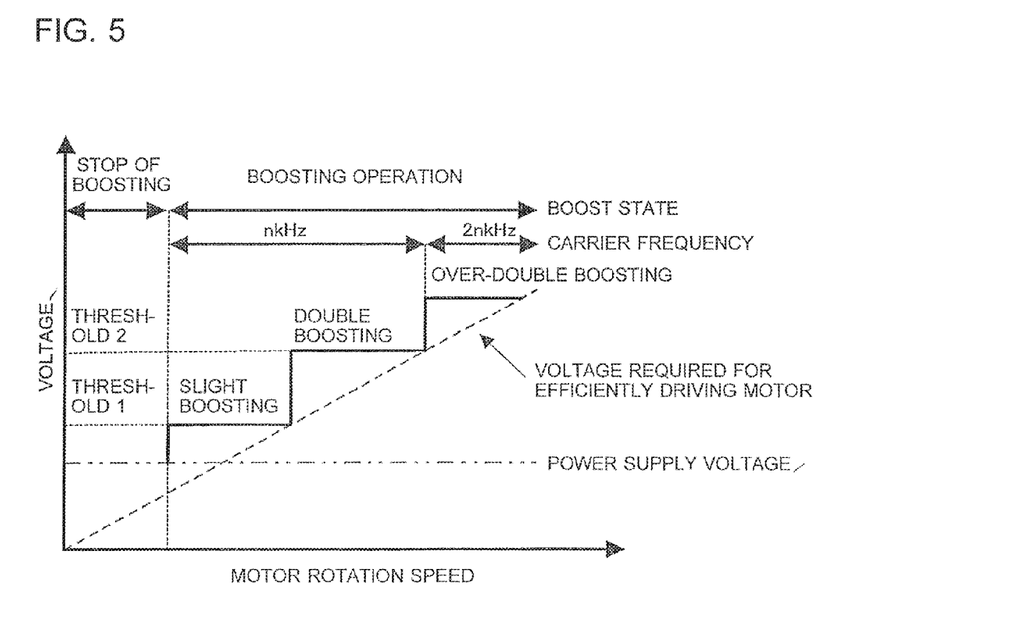
FIG. 5 is a diagram showing a relationship among the carrier frequency, the boost mode (slight boosting, double boosting, over-double boosting), and the boost state of the power conversion device in FIG. 1.

FIG. 5 is a diagram showing a relationship between the carrier frequency and three boost states of slight boosting, double boosting, and over-double boosting. In slight boosting, the boost amount is a minimum boost amount with which it is possible to control the reactor current, and the voltage is smaller than double the power supply voltage (the output voltage of the rectifier 2). In double boosting, the boost amount is a boost amount by which the voltage is made equal to double the power supply voltage. In over-double boosting, there is no problem with any value larger than that in double boosting, but the upper limit is determined on the basis of the withstand voltage of an electronic component forming the circuit, or the like. As shown in FIG. 5, the voltage required for efficiently driving the motor is proportional to a motor rotation speed.

Here, a boosting operation from stop of boosting to slight boosting will be described. By the MLC control unit 39 controlling the booster circuit 30 via the MLC driving circuit 17, it is possible to control the reactor current. Then, by controlling the reactor current, it is possible to decrease a harmonic flowing out to the system side. Thus, the MLC control unit 39 starts boosting from a region where a voltage required for efficiently driving the motor 16 is lower than the power supply voltage. However, this boosting is slight boosting in which the boost amount is maintained to such a necessary minimum amount that it is possible to control the reactor current. Slight boosting is performed in order to achieve loss minimum. For a criterion for performing boosting operation, a parameter from which the state of an input current such as the reactor current is recognized is used. Alternatively, a criterion may be determined by using a parameter from which a relationship with the input current can be inferred, such as a motor current or a motor rotation speed, or an operation command for an air conditioner. The motor current and the motor rotation speed are acquired from the motor current sensors 14 and 15. The operation command for the air conditioner is acquired, for example, from the air conditioner control device 21.

The carrier frequency determination unit 37 sets double boosting when the voltage required for driving the motor 16 exceeds a predetermined threshold 1, and sets over-double boosting when the voltage required for driving the motor 16 exceeds a predetermined threshold 2. The carrier frequency determination unit 37 sets the carrier frequency to 2n kHz during over-double boosting, and sets the carrier frequency to n kHz during double boosting or slight boosting. For example, when the carrier frequency during double boosting is 4 kHz, the carrier frequency during over-double boosting is 8 kHz. The example of FIG. 5 has two types of the carrier frequency. However, during double boosting, the ripple current becomes zero regardless of the carrier frequency, the carrier frequency does not need to be n kHz (does not need to be 4 kHz in this example), and a carrier frequency convenient to an applied system may be selected.

In the states of slight boosting, double boosting, and over-double boosting, or when the carrier frequency is switched to n kHz or 2n kHz, hysteresis characteristics are desirably provided for preventing chattering in each state.

Figure 6:
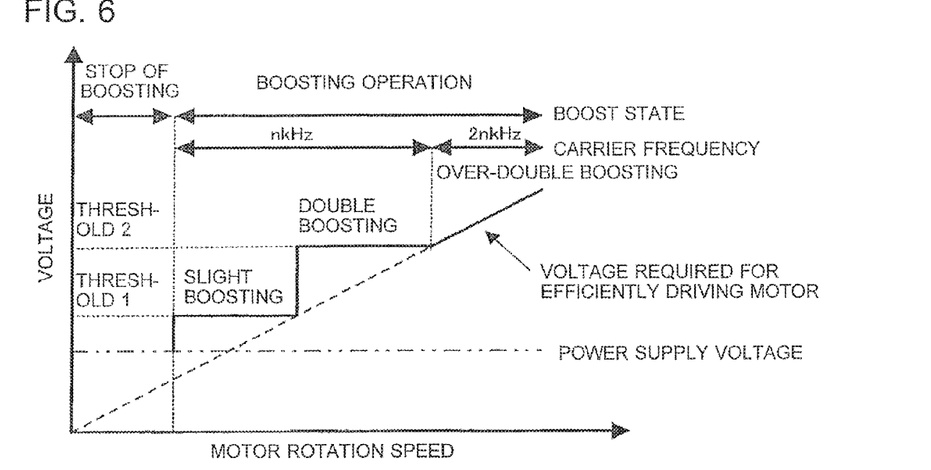
FIG. 6 is a diagram showing a modification of FIG. 5.

The boost amount during over-double boosting is not particularly limited. Thus, as shown in FIG. 6, the boost amount may be varied so as to agree with the voltage required for efficiently driving the motor 16. In the example shown in FIG. 6, during over-double boosting, it is possible to linearly increase the boost amount by adjusting ON times of the first switching element 8 and the second switching element 9 shown in FIG. 2(d). That is, by lengthening the ON times of the first switching element 8 and the second switching element 9, it is possible to increase the boost voltage. This process of adjusting the ON times is performed by the MLC control unit 39.

Advantageous Effects of Embodiment 1

As described above, according to Embodiment 1, the booster circuit 30 is configured as described above, and is configured to change the carrier frequency at which the first switching element 8 and the second switching element 9 are turned ON/OFF, in accordance with information (a motor rotation speed, etc.) corresponding to the operation state of the refrigeration air-conditioning apparatus (refrigeration cycle apparatus). Thus, it is possible to decrease the carrier frequency without increasing the ripple current flowing through the reactor 5. Accordingly, it is possible to decrease switching loss. Since an increase in the ripple current is suppressed, the reactor 5 and the filter for ripple current absorption are avoided from being increased in size, thereby achieving cost reduction. In particular, in a zone in which the carrier frequency is decreased (e.g., to approximately ½ of the carrier frequency that is used as a reference), it is possible to minimize the reactor 5 and the smoothing capacitor 12 by setting the boost amount of the booster circuit 30 such that double boosting is performed. In the refrigeration cycle apparatus such as a refrigeration air-conditioning apparatus, importance is placed on full-year energy consumption efficiency (APF). The degree of contribution of efficiency at the low-speed side to APF is high. Thus, a merit by decreasing the carrier frequency at the low-speed side is great and matches with operation of the refrigeration cycle apparatus.

Embodiment 2

Regarding a power conversion device according to Embodiment 2 of the present invention, the difference from the power conversion device according to Embodiment 1 will be mainly described.

(Configuration of Power Conversion Device)

Figure 7:
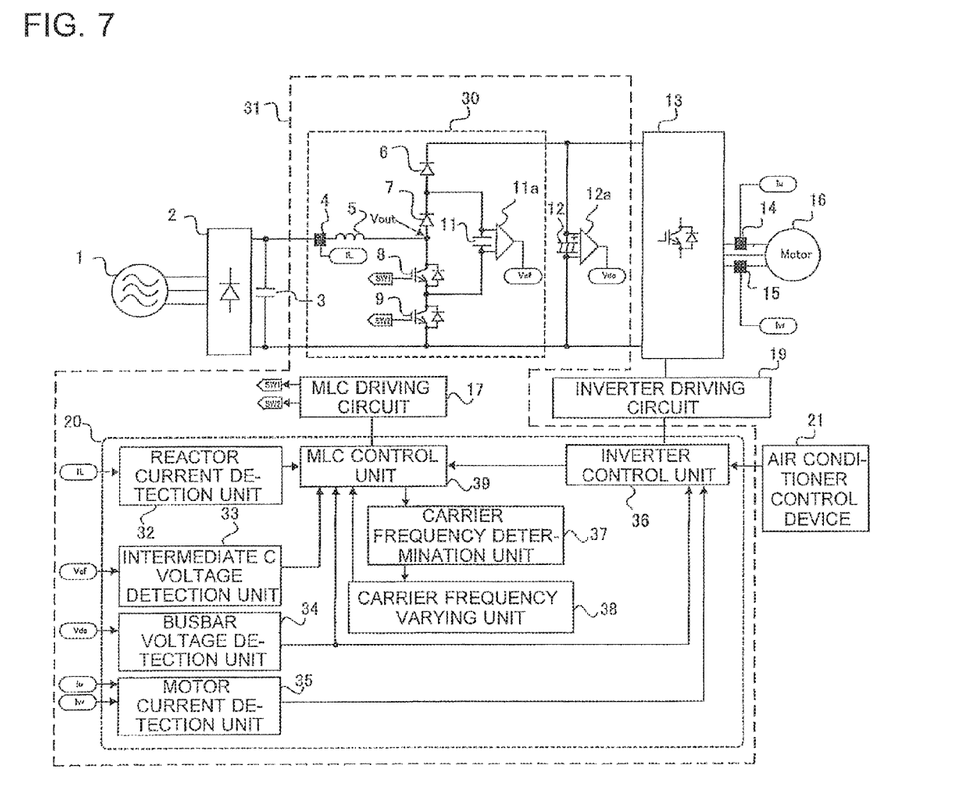
FIG. 7 is a circuit diagram of a power conversion device according to Embodiment 2 of the present invention.
Figure 8:
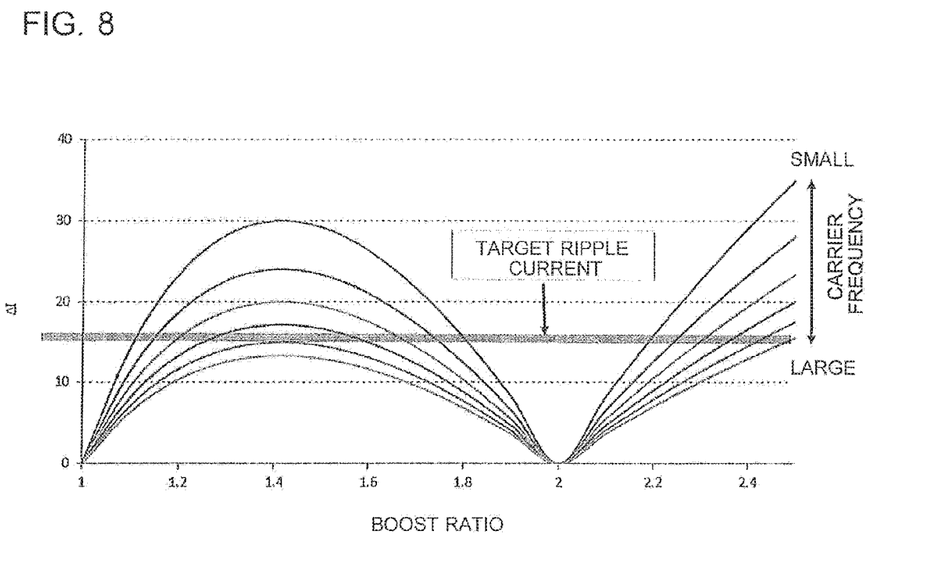
FIG. 8 is a diagram showing a relationship among the boost ratio, the ripple current, and the carrier frequency of the power conversion device in FIG. 7.

FIG. 7 is a configuration diagram of the power conversion device according to Embodiment 2 of the present invention. FIG. 8 is a diagram showing a relationship among a boost ratio, a ripple current, and a carrier frequency of the power conversion device in FIG. 7. The carrier frequency determination unit 37 in Embodiment 2 determines a carrier frequency on the basis of a condition obtained from the MLC control unit 39. The relationship among the carrier frequency, the ripple current ΔI, and the boost ratio in MLC is a relationship as shown in FIG. 8. Here, the boost ratio is a ratio between a voltage output by the rectifier 2 and a voltage after boosting. It is found that the ripple current decreases as the carrier frequency increases, and the ripple current changes in response to the boost ratio. When the ripple current is varied in response to the boost ratio, the filter for absorbing the ripple current needs to be designed at a point at which the ripple current becomes maximum. Thus, control in which the ripple current is made constant is performed. To make a generated ripple current constant, it is understood that a carrier frequency at an intersection point with a target ripple current relative to each boost ratio only needs to be selected. That is, the carrier frequency is varied in response to the boost ratio.

In Embodiment 2, a relationship between the carrier frequency and the boost ratio for making the ripple current constant is stored as a table or a calculation formula, for example, in the carrier frequency determination unit 37. The MLC control unit 39 obtains the boost ratio on the basis of control information from the inverter control unit 36. The carrier frequency determination unit 37 determines the carrier frequency on the basis of the boost ratio from the MLC control unit 39 by referring to the above table (calculation formula). The carrier frequency varying unit 38 sets the information on the carrier frequency determined by the carrier frequency determination unit 37, by writing the information into the storage unit of the MLC control unit 39. Similarly as in the case of Embodiment 1 described above, the MLC control unit 39 performs ON/OFF control on the first switching element 8 and the second switching element 9 on the basis of the changed carrier frequency, to obtain a desired boost voltage. A pattern of ON/OFF control of the first switching element 8 and the second switching element 9 is the same as in Embodiment 1 described above (see FIG. 2).

As shown in FIG. 8, in a condition that the boost ratio is two times, control in which the boost ratio is set to "2" is preferably performed at a boost ratio of approximately 2 by making the ripple current zero. Due to variation of the power supply voltage, the boost ratio is different in some cases even when a boost target value is the same. In such cases, since the boost ratio is calculated by the MLC control unit 39, the boost target value may be varied such that the boost ratio is "2". That is, the boost target value only needs to be higher than the voltage required by the inverter circuit 13, and thus the boost ratio is set to "2" by changing the boost target value in such a range. In the above description, the example where the ripple current is made constant, that is, set to a reference value has been described, but the ripple current may be controlled to a value equal to or lower than the reference value.

Advantageous Effects of Embodiment 2

A filter for suppressing a ripple current flowing out to the system side, that is, a filter for ripple current absorption, needs to be designed such that an attenuation amount is equal to or less than the allowable value of the ripple current, and thus is designed under a condition that the ripple current becomes maximum. However, the ripple filter 3, which is needed for absorbing the ripple current that is maximum, is increased in size, resulting in an increase in the cost. According to Embodiment 2, since the generated ripple current is constant (or lower), it is possible to reduce the size of the ripple filter 3, so that it is possible to decrease the required cost.

Embodiment 3

In Embodiment 3, an example where the power conversion device according to Embodiment 1 or Embodiment 2 is applied to a compressor 51 of an air conditioner will be described.

(Configuration and Operation of Air Conditioner)

Figure 9:
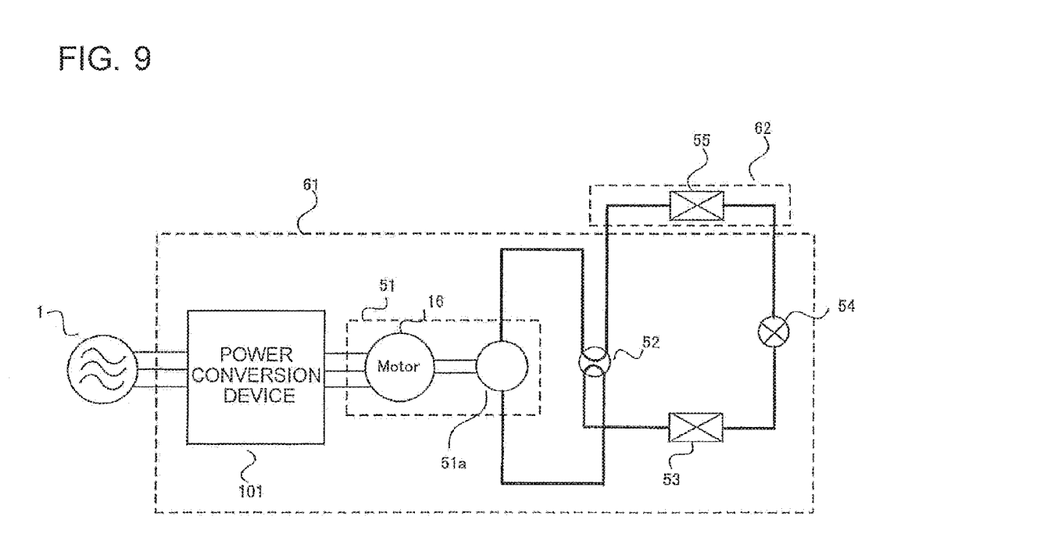
FIG. 9 is a refrigerant circuit diagram of a refrigeration air-conditioning apparatus according to Embodiment 3 of the present invention.

FIG. 9 is a configuration diagram of an air conditioner according to Embodiment 3 of the present invention. Hereinafter, the case where the power conversion device according to Embodiment 1 or Embodiment 2 is applied to the compressor 51 of the air conditioner will be described with reference to FIG. 9.

A power conversion device 101 shown in FIG. 9 is the power conversion device according to Embodiment 1 or Embodiment 2, and is configured to be supplied with power from an AC power supply 1 and supply the power to the motor 16 to rotationally drive the motor 16. The motor 16 is connected to a compression element 51a, and the motor 16 and the compression element 51a form the compressor 51 which compresses refrigerant.

A refrigeration cycle (refrigerant circuit) is formed by the compressor 51, a four-way valve 52, an outdoor heat exchanger 53, an expansion device 54, an indoor heat exchanger 55, and a four-way valve 52 being connected in a loop by refrigerant pipes in the order of the compressor 51, the four-way valve 52, the outdoor heat exchanger 53, the expansion device 54, the indoor heat exchanger 55, the four-way valve 52, and the compressor 51. Among them, an outdoor unit 61 is configured to include the power conversion device 101, the compressor 51, the four-way valve 52, the outdoor heat exchanger 53, and the expansion device 54, and an indoor unit 62 is configured to include the indoor heat exchanger 55. During cooling operation, the outdoor heat exchanger 53 functions as a condenser, and the indoor heat exchanger 55 functions as an evaporator.

Next, operation of the refrigeration air-conditioning apparatus shown in FIG. 9 will be described with cooling operation as an example.

In performing the cooling operation, the four-way valve 52 switches a flow path beforehand such that the refrigerant discharged from the compressor 51 flows toward the outdoor heat exchanger 53 and the refrigerant flowing out the indoor heat exchanger 55 flows toward the compressor 51. When the motor 16 of the compressor 51 is rotationally driven by the power conversion device 101, the compression element 51a of the compressor 51 connected to the motor 16 compresses the refrigerant, and the compressor 51 discharges high-temperature and high-pressure refrigerant. The high-temperature and high-pressure refrigerant discharged from the compressor 51 flows via the four-way valve 52 into the outdoor heat exchanger 53 and exchanges heat with outdoor air at the outdoor heat exchanger 53, to reject heat. The refrigerant flowing out the outdoor heat exchanger 53 is expanded by the expansion device 54 to be reduced in pressure into low-temperature and low-pressure two-phase gas-liquid refrigerant, flows into the indoor heat exchanger 55, exchanges heat with the air in an air-conditioned space to evaporate into low-temperature and low-pressure gas refrigerant, and flows out the indoor heat exchanger 55. The gas refrigerant flowing out the indoor heat exchanger 55 is sucked into the compressor 51 via the four-way valve 52, and compressed again. The above operation is repeated.

Although the example where the power conversion device according to Embodiment 1 or Embodiment 2 is applied to the compressor 51 of the air conditioner has been shown in FIG. 9, the present invention is not limited thereto, and the power conversion device according to Embodiment 1 or Embodiment 2 may be applied to, for example, a power supply for driving a fan (not shown) that sends air to the outdoor heat exchanger 53. In addition, the power conversion device according to Embodiment 1 or Embodiment 2 may be applied to a heat pump apparatus, a refrigerating apparatus, and another general refrigeration cycle apparatus other than the air conditioner.

REFERENCE SIGNS LIST

1 AC power supply 2 rectifier 3 ripple filter 4 reactor current sensor 5 reactor 6 first backflow prevention diode 7 second backflow prevention diode 8 first switching element 9 second switching element 11 intermediate capacitor 11a voltage sensor 12 smoothing capacitor 12a voltage sensor 13 inverter circuit 14, 15 motor current sensor 16 motor 17 MLC driving circuit 19 inverter driving circuit 20 controller 21 air conditioner control device 30 booster circuit 31 booster circuit unit 32 reactor current detection unit 33 intermediate C voltage detection unit 34 busbar voltage detection unit 35 motor current detection unit 36 inverter control unit 37 carrier frequency determination unit 38 carrier frequency varying unit 39 MLC control unit 40 smoothing capacitor voltage command calculation unit 41 reactor current command calculation unit 42 intermediate C voltage command calculation unit 51 compressor 51a compression element 52 four-way valve 53 outdoor heat exchanger 54 expansion device 55 indoor heat exchanger 61 outdoor unit 62 indoor unit 101 power conversion device

The invention claimed is:
1. A power conversion device comprising:
a rectifier configured to rectify an input AC voltage supplied from an AC power supply;
a booster circuit including
a first backflow prevention diode, a second backflow prevention diode, a first switching element, and a second switching element connected in series,
a reactor connected at one end thereof to the rectifier and connected at another end thereof to a connection point between the second backflow prevention diode and the first switching element, and
an intermediate capacitor connected in parallel with a series circuit of the second backflow prevention diode and the first switching element, and
configured to boost an output voltage of the rectifier;
a smoothing capacitor configured to smooth an output voltage from the booster circuit;
an inverter connected in parallel with the smoothing capacitor and configured to invert a DC voltage to an inverted AC voltage and drive a motor that is a part of a device supplied with the inverted AC voltage; and
a controller configured to control the inverter, determine a carrier frequency on a basis of control information from the inverter, and control the first switching element and the second switching element on a basis of information on the determined carrier frequency, the intermediate capacitor being charged via the second backflow prevention diode as a result of an ON operation of the second switching element, and the intermediate capacitor being discharged via the first backflow prevention diode as a result of an ON operation of the first switching element, the first switching element and the second switching element being turned ON/OFF with the carrier frequency, the carrier frequency being changed in accordance with information based on an operation state of the device supplied with the inverted AC voltage.

2. The power conversion device of claim 1, wherein the control information from the inverter includes a motor rotation speed.

3. The power conversion device of claim 1, wherein the control information from the inverter includes a boost target voltage.

4. The power conversion device of claim 1, wherein the booster circuit selectively outputs a plurality of boost voltages including a slight boost voltage lower than double the output of the rectifier, a double boost voltage equal to double the output of the rectifier, and an over-double boost voltage higher than the double boost voltage, and the controller determines a boost target voltage on a basis of a motor rotation speed that is control information from the inverter, and selects a carrier frequency corresponding to the double boost voltage, in a region where the boost target voltage is equal to or less than the double boost voltage.

5. The power conversion device of claim 1, wherein the carrier frequency can be one of at least two different carrier frequencies.

6. The power conversion device of claim 5, wherein the two different carrier frequencies are n kHz and 2n kHz.

7. The power conversion device of claim 1, wherein the carrier frequency is determined such that a ripple current flowing through the reactor is equal to or less than a reference value.

8. The power conversion device of claim 7, wherein the carrier frequency for causing the ripple current to be equal to or less than the reference value, is determined by using a relationship between a predetermined boost ratio and a ripple current on a basis of a target boost ratio of the booster circuit.

9. The power conversion device of claim 1, wherein a boost amount is adjusted such that a boost ratio is two times when a target boost ratio is equivalent to a double boost voltage or less.

10. The power conversion device of claim 1, wherein at least one of the first switching element, the second switching element, the first backflow prevention diode, and the second backflow prevention diode is formed of a wide band gap semiconductor.

11. A refrigeration cycle apparatus comprising:

a refrigerant circuit in which a compressor, a condenser, an expansion device, and an evaporator are connected in a loop by a refrigerant pipe; and a power conversion device configured to supply power to the compressor to drive the compressor, wherein the power conversion device is the power conversion device of claim 1.

12. The power conversion device of claim 1, wherein the first backflow prevention diode is not in parallel with any other element, and the second backflow prevention diode is not in parallel with any other element.

13. The power conversion device of claim 1, wherein the backflow prevention diode is operable to continually prevent a first backflow current from flowing from a first input node to a first output node in a first backflow direction, and the second backflow prevention diode is operable to continually prevent a second backflow current from flowing from a second input node to a second output node in a second backflow direction.

* * * * *